United States Patent
Thoemmes et al.

(10) Patent No.: US 12,020,036 B2
(45) Date of Patent: Jun. 25, 2024

(54) TRAJECTORY-BASED HIERARCHICAL AUTOSCALING FOR SERVERLESS APPLICATIONS

(71) Applicant: RED HAT, INC., Raleigh, NC (US)

(72) Inventors: Markus Thoemmes, Lückenburg (DE); Roland Ludwig Huss, Bavaria (DE)

(73) Assignee: Red Hat, Inc., Raleigh, NC (US)

( * ) Notice: Subject to any disclaimer, the term of this patent is extended or adjusted under 35 U.S.C. 154(b) by 92 days.

(21) Appl. No.: 17/513,246

(22) Filed: Oct. 28, 2021

(65) Prior Publication Data

US 2023/0140272 A1    May 4, 2023

(51) Int. Cl.
*G06F 9/4401*    (2018.01)
*G06F 11/30*    (2006.01)
*G06F 11/34*    (2006.01)

(52) U.S. Cl.
CPC .......... *G06F 9/4406* (2013.01); *G06F 11/302* (2013.01); *G06F 11/3495* (2013.01)

(58) Field of Classification Search
None
See application file for complete search history.

(56) References Cited

U.S. PATENT DOCUMENTS

| | | | | |
|---|---|---|---|---|
| 9,971,621 | B1 * | 5/2018 | Berg | G06F 9/5077 |
| 10,585,693 | B2 | 3/2020 | Aydelott et al. | |
| 10,594,562 | B1 * | 3/2020 | Rastogi | H04L 41/0896 |
| 2015/0058265 | A1 * | 2/2015 | Padala | G06N 20/00 706/12 |
| 2017/0244607 | A1 * | 8/2017 | Dujodwala | H04L 41/0896 |
| 2019/0222638 | A1 * | 7/2019 | Keller | H04L 67/10 |
| 2020/0160246 | A1 | 5/2020 | Pandey et al. | |
| 2020/0204623 | A1 | 6/2020 | Einkauf et al. | |
| 2020/0287794 | A1 | 9/2020 | Rastogi et al. | |
| 2021/0081243 | A1 | 3/2021 | Jain | |
| 2021/0357255 | A1 * | 11/2021 | Mahadik | G06F 11/3006 |

OTHER PUBLICATIONS

Extended European Search Report mailed on Jun. 22, 2022, for European Application No. 22151660.2-1203, filed Jan. 14, 2022, pp. 8.

Nilabja Roy et al: "Efficient Autoscaling in the Cloud Using Predictive Models for Workload Forecasting", Cloud Computing (Cloud), 2011 IEEE International Conference on, IEEE, Jul. 4, 2011 (Jul. 4, 2011), pp. 500-507, XP031934628, DOI: 10.1109/CLOUD.2011.42; ISBN: 978-1-4577-0836-7.

(Continued)

*Primary Examiner* — Fahmida Rahman
(74) *Attorney, Agent, or Firm* — Womble Bond Dickinson (US) LLP

(57) ABSTRACT

A method includes monitoring, during a first time interval, traffic associated with one or more applications executed by a cluster of compute nodes and determining, in view of the traffic associated with the one or more applications during the first time interval, that the traffic is predicted to exceed a capacity threshold of the cluster of compute nodes at an end of a second time interval. The method further includes initiating startup of an additional compute node to be added to the cluster of compute nodes for executing replicas of the one or more applications.

17 Claims, 6 Drawing Sheets

(56) References Cited

OTHER PUBLICATIONS

Gandini, A. et al. (Oct. 18, 2019). "Amazon Aurora Serverless Scaling Driven by Application Metrics," Cloud-native Development Line Manager, pp. 5.
Bhattacharjee, A. et al. (Apr. 11, 2019). "BARISTA: Efficient and Scalable Serverless Serving System for Deep Learning Prediction Services," Department of Electrical Engineering and Computer Science, Vanderbilt University, Nashville, Tennessee, USA, pp. 11.
"Scaling Instruction" AWS, pp. 5.

* cited by examiner

TRAJECTORY-BASED HIERARCHICAL AUTOSCALING FOR SERVERLESS APPLICATIONS

TECHNICAL FIELD

Aspects of the present disclosure relate to scaling of serverless applications, and more particularly, to trajectory-based hierarchical autoscaling for serverless application clusters.

BACKGROUND

A serverless application system may be executed by a cloud computing system. The cloud computing system may dynamically manage the allocation and provisioning of serverless functions on servers of the cloud computing system. The serverless application may be execution environments for the performance of various functions.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
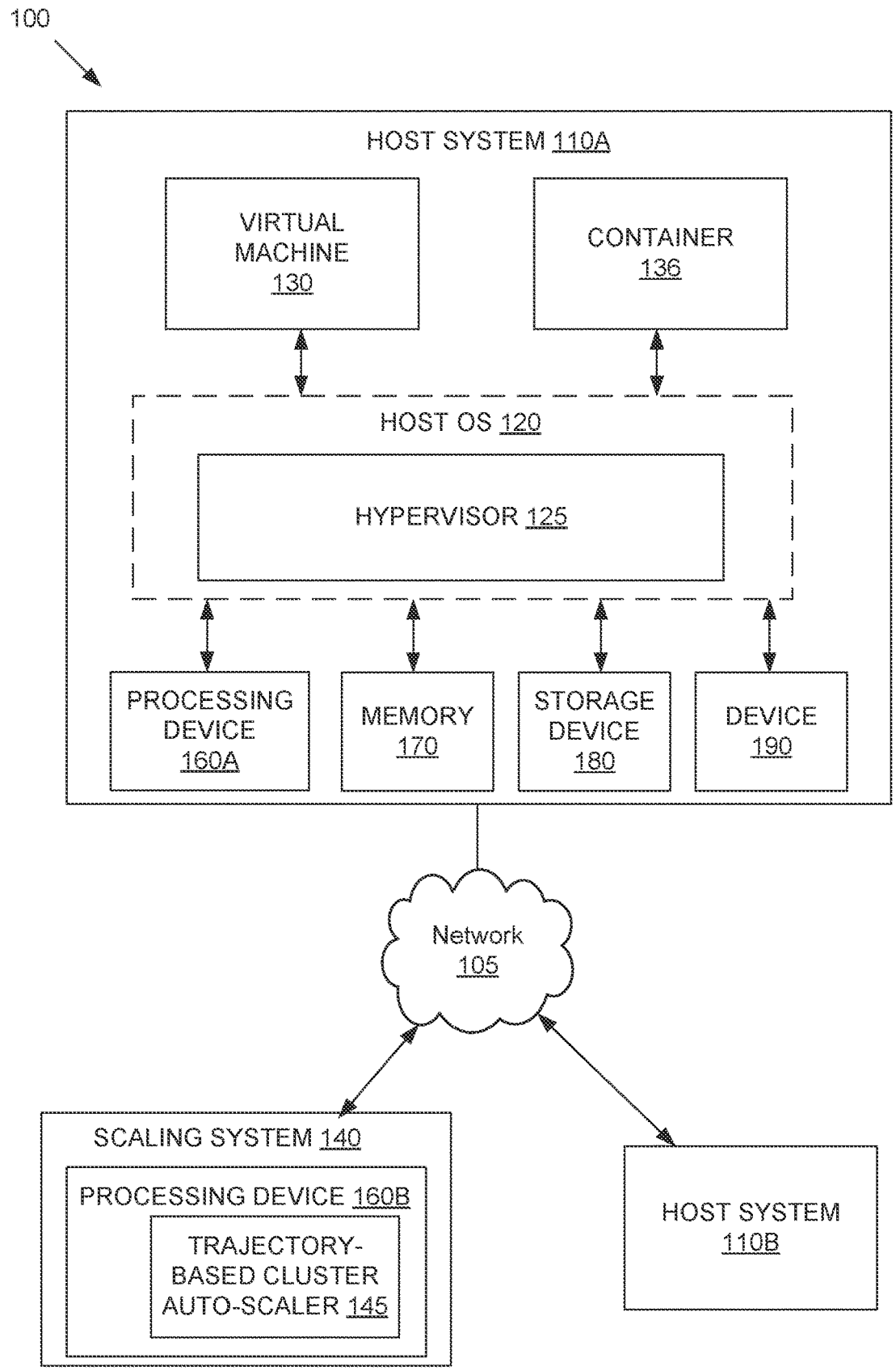
FIG. 1 is a system diagram that illustrates an example system for trajectory-based autoscaling of a serverless application cluster, in accordance with some embodiments.

Serverless applications may serve large parallel workloads without manual scaling of the applications. Serverless applications may scale automatically based on traffic-related metrics, such as requests-per-second or concurrency, to determine how many replicas of the application are needed to process a particular workload. Thus, serverless applications can elastically scale up and or down as necessary to support the corresponding workload. Instantiating a new replica of an application may take a relatively small amount of time (e.g., 1-3 seconds) so creating and deleting application replicas is relatively cheap. When all compute nodes of a cluster hosting the application replicas are full, an additional compute node may need to be started to support additional scaling of the application. However, starting an additional compute node may require a relatively large amount of time (e.g., up to 30 minutes). Therefore, the elasticity of scaling serverless applications may be limited when additional compute nodes are required to support the scaling. Thus, conventional systems may either overprovision the number of compute nodes required by the hosted applications or start an additional node upon reaching a maximum compute capacity of the cluster, thus nullifying the elasticity of the serverless platform. For example, conventional systems scale a cluster in a reactive fashion when there are no nodes with enough capacity available to fulfill a scheduling request for an application replica resulting in latencies from waiting for the new node to start up.

Aspects of the disclosure address the above-noted and other deficiencies by providing trajectory-based hierarchical autoscaling for serverless applications. A trajectory-based cluster auto-scaler may collect metrics (e.g., traffic metrics such as requests per second or observed concurrency) from all the serverless applications hosted by a cluster of compute nodes. The trajectory-based auto-scaler may combine the metrics collected for the serverless applications on a cluster-wide scale to determine an overall traffic trajectory for the cluster. For example, the trajectory-based cluster auto-scaler may extrapolate historical and current traffic metrics to determine if the traffic trajectory may exceed a current capacity of the cluster at a future point in time (e.g., within a particular future window of time). Thus, the trajectory-based auto-scaler may anticipate the need for additional compute nodes of a cluster hosting serverless applications.

In one example, the trajectory-based auto-scaler may perform one or more statistical analyses or apply one or more machine learning algorithms on collected traffic metrics for each of the serverless applications hosted by the cluster to predict future traffic for the entire cluster. Therefore, the trajectory-based auto-scaler may predict whether a capacity threshold of the cluster will be exceeded and then actively scale up the cluster before the cluster reaches its capacity limit. In some examples, the trajectory-based auto-scaler may incorporate traffic burst capacity, panic windows (e.g., scaling up multiple nodes at once) and other serverless scaling techniques.

By proactively anticipating the overall traffic of a cluster, additional compute nodes may be started and added to the cluster before the cluster reaches its present capacity, which reduces latency of serverless applications of the cluster due to startup times of additional nodes when the cluster reaches capacity. Additionally, initiating startup of an additional compute node prior to reaching capacity may make over-allocation of compute resources to the cluster unnecessary, providing for more efficient allocation of computing resources.

FIG. 1 depicts a high-level component diagram of an illustrative example of a computer system architecture 100, in accordance with one or more aspects of the present disclosure. One skilled in the art will appreciate that other computer system architectures are possible, and that the implementation of a computer system utilizing examples of the invention are not necessarily limited to the specific architecture depicted by FIG. 1.

As shown in FIG. 1, computer system architecture 100 includes host systems 110A-B and scaling system 140. The host systems 110A-B and scaling system 140 include one or more processing devices 160A-B, memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more devices 190 (e.g., a Peripheral Component Interconnect [PCI] device, network interface controller (NIC), a video card, an I/O device, etc.). In certain implementations, memory 170 may be non-uniform access (NUMA), such that memory access time depends on the memory location relative to processing devices 160A-B. It should be noted that although, for simplicity, host system 110A is depicted as including a single processing device 160A, storage device 180, and device 190 in FIG. 1, other embodiments of host systems 110A may include a plurality of processing devices, storage devices, and devices. Similarly, scaling system 140 and host system 110B may include a plurality of processing devices, storage devices, and devices. The host systems 110A-B and scaling system 140 may each be a server, a mainframe, a workstation, a personal computer (PC), a mobile phone, a palm-sized computing device, etc. In embodiments, host systems 110A-B and scaling system 140 may be separate computing devices. In some embodiments, host systems 110A-B and/or scaling system 140 may be implemented by a single computing device. For clarity, some components of scaling system 140 and host system 110B are not shown. Furthermore, although computer system architecture 100 is illustrated as having two host systems, embodiments of the disclosure may utilize any number of host systems.

Host system 110A may additionally include one or more virtual machines (VMs) 130, containers 136, and host operating system (OS) 120. VM 130 is a software implementation of a machine that executes programs as though it were an actual physical machine. Container 136 acts as an isolated execution environment for different functions of applications. The VM 130 and/or container 136 may be an instance of a serverless application or function for executing one or more applications of a serverless framework. Host OS 120 manages the hardware resources of the computer system and provides functions such as inter-process communication, scheduling, memory management, and so forth.

Host OS 120 may include a hypervisor 125 (which may also be known as a virtual machine monitor (VMM)), which provides a virtual operating platform for VMs 130 and manages their execution. Hypervisor 125 may manage system resources, including access to physical processing devices (e.g., processors, CPUs, etc.), physical memory (e.g., RAM), storage device (e.g., HDDs, SSDs), and/or other devices (e.g., sound cards, video cards, etc.). The hypervisor 125, though typically implemented in software, may emulate and export a bare machine interface to higher level software in the form of virtual processors and guest memory. Higher level software may comprise a standard or real-time OS, may be a highly stripped down operating environment with limited operating system functionality, and/or may not include traditional OS facilities, etc. Hypervisor 125 may present other software (i.e., "guest" software) the abstraction of one or more VMs that provide the same or different abstractions to various guest software (e.g., guest operating system, guest applications). It should be noted that in some alternative implementations, hypervisor 125 may be external to host OS 120, rather than embedded within host OS 120, or may replace host OS 120.

The host systems 110A-B and scaling system 140 may be coupled (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a WiFi™ hotspot connected with the network 105 and/or a wireless carrier system that can be implemented using various data processing equipment, communication towers (e.g., cell towers), etc. The network 105 may carry communications (e.g., data, message, packets, frames, etc.) between the various components of host systems 110A-B and/or scaling system 140.

In embodiments, processing device 160B of the scaling system 140 may execute a trajectory-based cluster auto-scaler 145. The trajectory-based cluster auto-scaler 145 may pre-emptively scale a cluster (e.g., VMs 130) based on a trajectory, or estimates, of future traffic for serverless applications executed by the cluster. The cluster may include one or more compute nodes (e.g., VMs 130) for executing serverless applications. The trajectory-based cluster auto-scaler 145 may monitor traffic metrics (e.g., concurrent requests and instance invocations) for each serverless application executed by the cluster. The trajectory-based cluster auto-scaler 145 may combine the traffic metrics from the different serverless applications executing on the cluster to determine a traffic trajectory for the entire cluster. The trajectory-based cluster auto-scaler 145 may then use the traffic trajectory for the entire cluster to determine if a current maximum capacity, a capacity threshold, or other threshold of the cluster is likely to be exceeded at a future time, and if so, initiate startup of an additional processing node. For example, the trajectory-based cluster auto-scaler 145 may determine if the capacity will be exceeded at a future time corresponding to the time required to start an additional processing node. Further details regarding trajectory-based cluster auto-scaler 145 will be discussed at FIGS. 2-5 below.

Figure 2:
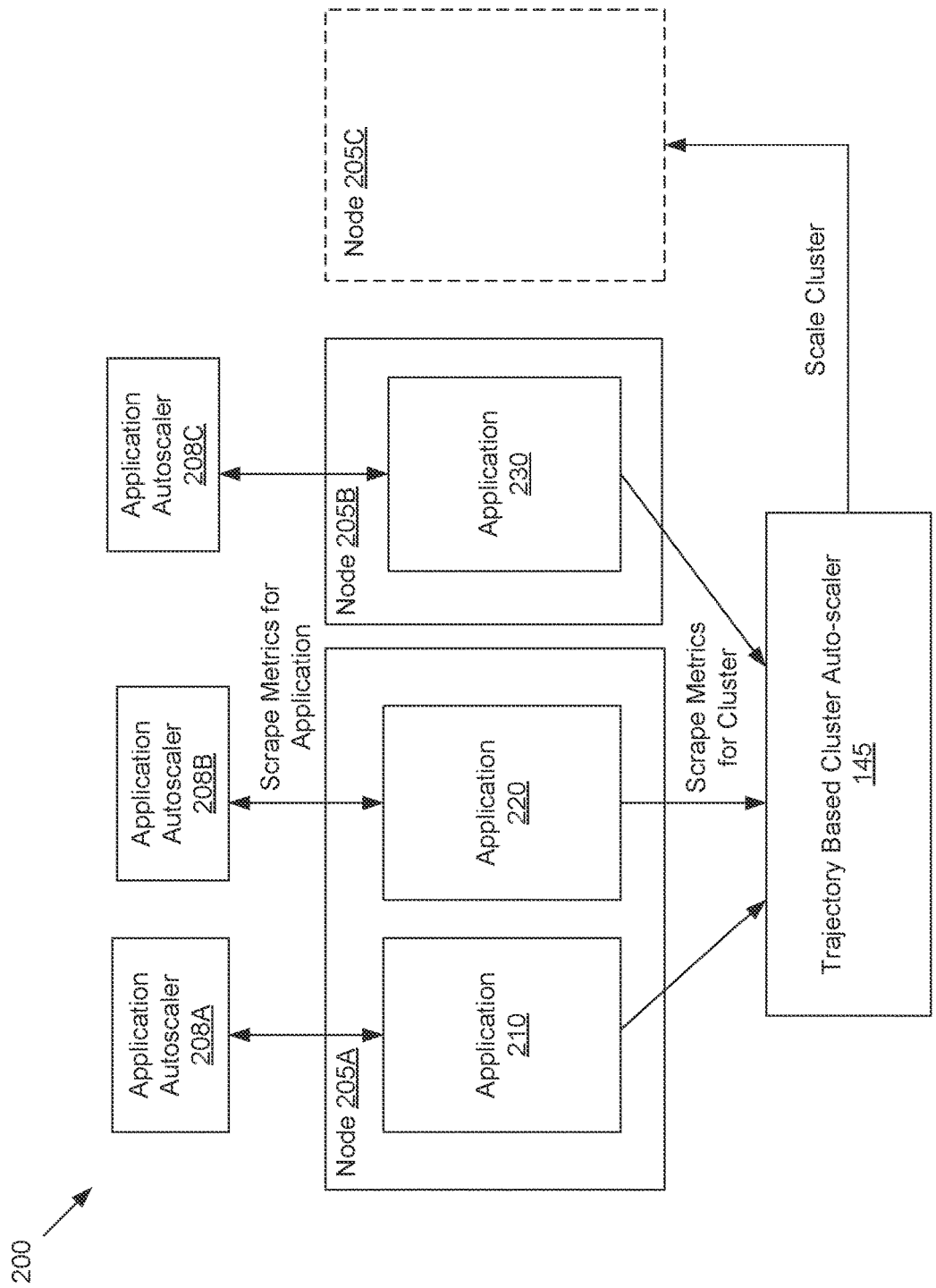
FIG. 2 is a block diagram that illustrates another example of a system for trajectory-based autoscaling of a serverless application cluster, in accordance with some embodiments.

FIG. 2 is a block diagram illustrating a scaling system 200 for trajectory-based autoscaling of a serverless application cluster, in accordance with some embodiments. In the depicted embodiment, the scaling system 200 includes an initial cluster of two compute nodes 205A-B for executing one or more serverless applications. For example, applications 210 and 220 may execute on node 205A and application 230 may execute on node 205B. It should be noted that although three applications are depicted as executing on two compute nodes, embodiments may include any number of applications executed by any number of compute nodes. Application auto-scalers 208A-C may be associated with each of the applications 210, 220, and 230, executing on the nodes 205A-B of the cluster. For example, as depicted, application auto-scaler 208A may be associated with application 210, application auto-scaler 208B may be associated with application 220, and application auto-scaler 208C may be associated with application 230. The application auto-scalers 208A-C may scrape traffic-related metrics from corresponding applications 210, 220, and 230 to appropriately scale the number of replicas to be instantiated for each of the applications, as needed. For example, the application auto-scalers 208A-C may scale the number of replicas for applications 210, 220, and 230 based on a number of concurrent requests for each of the corresponding applications 210, 220, and 230. In some embodiments, the number of replicas for applications can be further scaled based additional traffic metrics such as latencies of the serverless applications, runtimes of serverless application replicas executed by the serverless applications, idle times of the serverless applications, and/or any other metric associated with the serverless applications. Thus, applications 210, 220, and 230 may be scaled up and scaled down based on the traffic metrics associated with each of the applications 210, 220, and 230.

Additionally, the scaling system 200 may include a trajectory-based cluster auto-scaler 145 for proactively scaling the number of compute nodes of the cluster. While application replicas may be instantiated relatively quickly (e.g., a matter of seconds) allowing applications to be scaled in response to incoming traffic, compute nodes (e.g., virtual machines) may take larger amounts of time to startup (e.g., boot). Therefore, the trajectory-based cluster auto-scaler 145 proactively scales the number of compute nodes in a cluster by extrapolating current traffic trends of the applications 210, 220, and 230 to a future time to determine if additional compute nodes should be added to the cluster. Trajectory-based cluster auto-scaler 145 may scrape traffic metrics (e.g., traffic information, concurrent requests, requests per second, etc.) from each application executed by the cluster and aggregate the traffic metrics for the entire cluster. Therefore, the trajectory-based cluster auto-scaler 145 may monitor overall traffic of the cluster over time to predict future traffic using historic traffic data and current traffic data of the cluster.

In some examples, the trajectory-based cluster auto-scaler 145 may use statistical analysis, machine learning, or other techniques to predict future traffic levels for the cluster. For example, the trajectory-based cluster auto-scaler 145 may perform a regression analysis (e.g., linear regression) on a window of historical traffic data up to current traffic data to extrapolate a trend in the traffic levels of the cluster. In another example, the trajectory-based cluster auto-scaler 145 may train one or more machine learning algorithms using historical traffic data for the cluster and each of the applications of the cluster. The trajectory-based auto-scaler 145 may then apply the one or more machine learning algorithms to a portion of recent traffic data to predict traffic levels at a particular time into the future. In some examples, the trajectory-based auto-scaler 145 may account for high traffic times of day based on previous traffic data and may identify traffic patterns that tend to precede an increase in traffic. Thus, the trajectory-based cluster auto-scaler 145 may predict traffic levels at a time in the future and scale the cluster with additional nodes before the cluster reaches maximum capacity, a capacity threshold, or other traffic-related threshold.

In one example, the trajectory-based cluster auto-scaler 145 may predict the traffic level associated with the applications 210, 220, and 230 of the cluster at a future time corresponding to the length of time for a new compute node to be started. For example, if boot time for a new compute node is 30 minutes, then the trajectory-based cluster auto-scaler 145 can predict traffic levels 30 minutes or more into the future. Therefore, the trajectory-based cluster auto-scaler 145 can initiate startup of an additional compute node (e.g., node 205C) which may be finished booting before nodes 205A-B reach their capacity and can no longer support the workload. In one example, the trajectory-based cluster auto-scaler 145 may also incorporate traffic burst capacity, panic windows (e.g., scaling up multiple nodes at once), and any other techniques used for serverless scaling of individual serverless applications based on traffic and workload.

Figure 3:
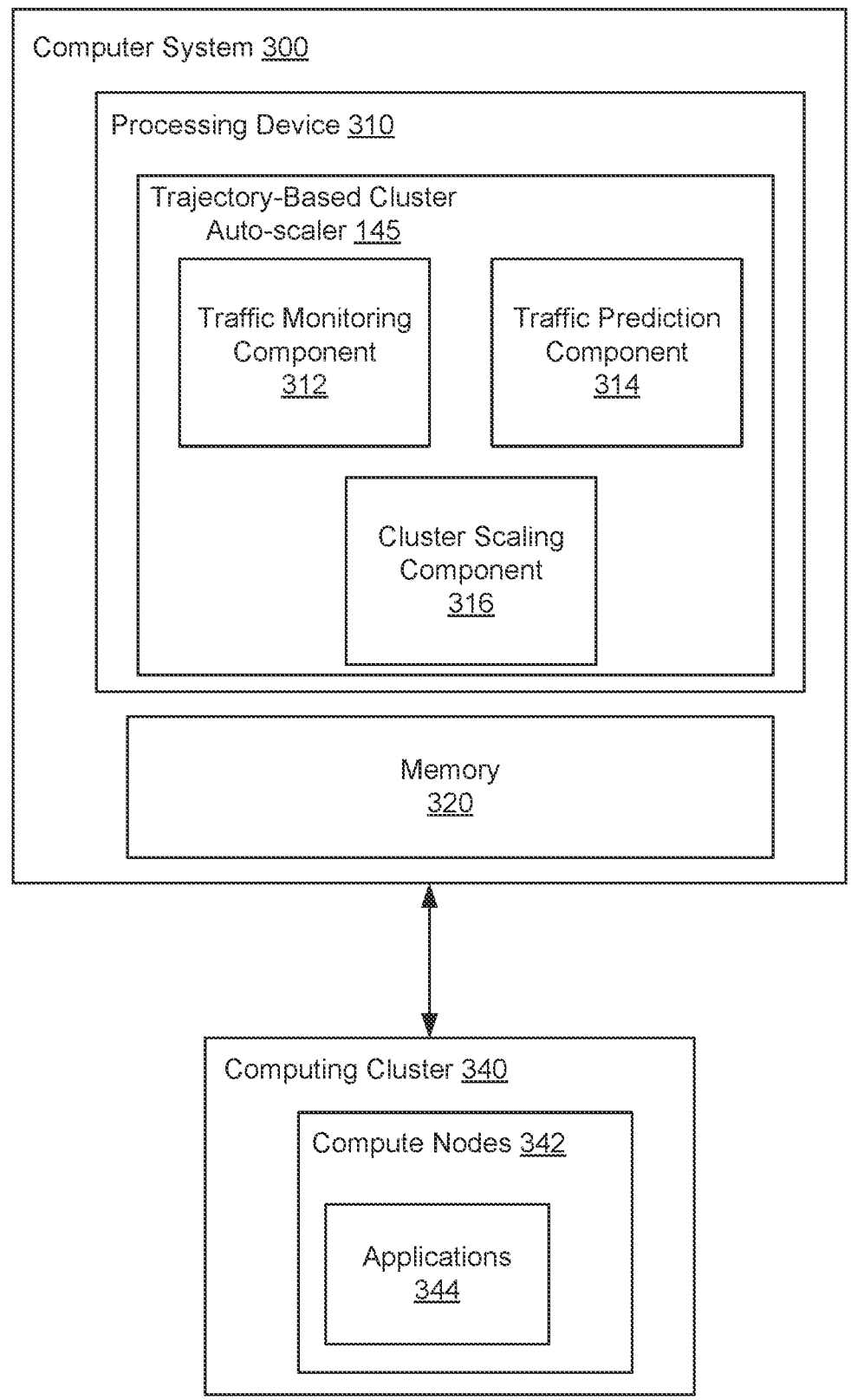
FIG. 3 is a block diagram of trajectory-based hierarchical scaling of a serverless application cluster, in accordance with some embodiments.

FIG. 3 is a is a block diagram that illustrates a computing system 300 for trajectory-based scaling of a cluster, according to some embodiments. Computing system 300 may include a processing device 310 and memory 320. Memory 320 may include volatile memory devices (e.g., random access memory (RAM)), non-volatile memory devices (e.g., flash memory) and/or other types of memory devices. Processing device 310 may be a central processing unit (CPU) or other processing device of computing system 300. In one example, computer system 300 may be coupled to a computing cluster 340. In another example, computer system 300 may be included within computing cluster 340 or computing cluster 340 may be included within computer system 300. The computing cluster 340 may include one or more compute nodes 342 for executing one or more applications 344 (e.g., serverless applications).

In one example, the processing device 310 may execute a trajectory-based cluster auto-scaler 145 to anticipate future high-traffic situations of the computing cluster 340 and to actively scale up the computing cluster 340 with additional compute nodes before the computing cluster 340 reaches the workload limits of the present compute nodes 342. The trajectory-based cluster auto-scaler 145 may include a traffic monitoring component 312, a traffic prediction component 314, and a cluster scaling component 316. The traffic monitoring component 312 may collect traffic metrics from the applications 344 of the computing cluster 340. The traffic metrics may include traffic data for each of the applications 344 such as requests-per-second, concurrent requests, etc. In some example, the traffic metrics may also include latencies of the serverless applications, runtimes of serverless application replicas executed by the serverless applications, idle times of the serverless applications, and/or any other metric associated with the serverless applications. The traffic monitoring component 312 may aggregate the traffic metrics (e.g., traffic data) for all the applications 344 executing on the compute nodes 342 of the computing cluster 340. The traffic monitoring component 312 may collect and store historical traffic data of the entire computing cluster 340 and continually monitor current traffic data for the computing cluster 340.

Figure 4:
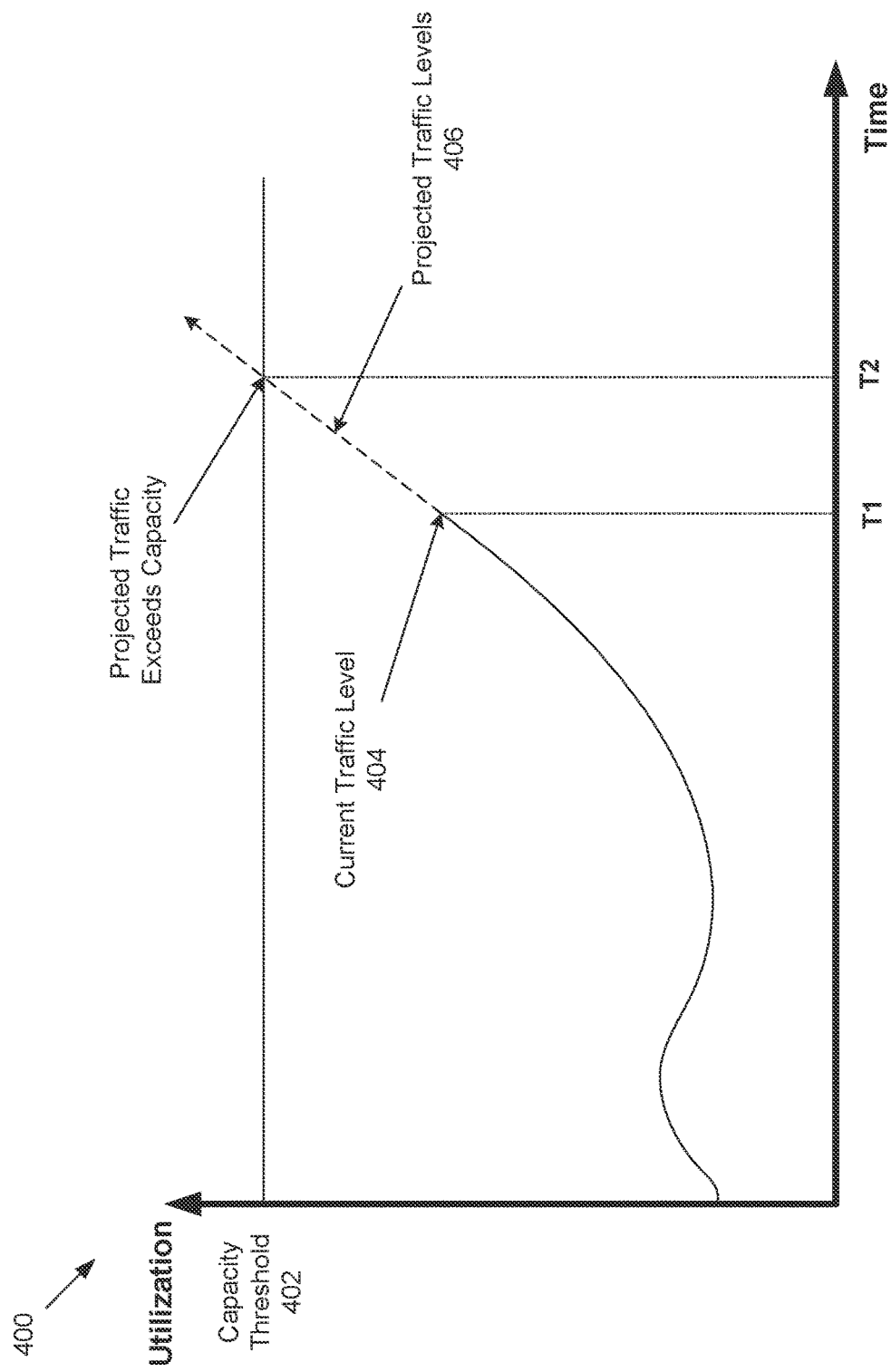
FIG. 4 is a time-utilization diagram illustrating projected cluster utilization for trajectory-based autoscaling of a serverless cluster, in accordance with some embodiments.

The traffic prediction component 314 may perform one or more analyses on the historical and current traffic data of the computing cluster 340 to predict future traffic levels for the computing cluster 340. For example, the traffic prediction component 314 may perform one or more regression analyses on a window of historical traffic data leading up to the current traffic data (e.g., minutes to several hours into the historical traffic data) to extrapolate the traffic level trends into the future (e.g., as depicted in FIG. 4). In another example, the traffic prediction component 314 may train a machine learning model (e.g., a deep learning model, artificial neural network, etc.) with the historical traffic data collected by the traffic monitoring component 312. The traffic prediction component 314 may then apply the trained machine learning model to a portion of recent historical traffic data up to the current traffic data to predict future traffic levels for the computing cluster 340. For example, the machine learning model may identify traffic level shapes corresponding to traffic level increases, associate time of day with corresponding traffic levels, or determine any other metrics that affect overall traffic levels for applications 344 and the computing cluster 340. In one example, the traffic prediction component 314 may determine a time it takes for a new compute node to be booted up and added to the computing cluster 340. The traffic prediction component 314 may then predict the traffic level of the computing cluster 340 at a time into the future corresponding to the amount of time for a new compute node to be booted and added to the computing cluster 340.

The cluster scaling component 316 may determine, based on the traffic level predictions of the traffic prediction component 314, whether to scale the computing cluster 340.

For example, the cluster scaling component 316 may determine whether the predicted traffic level of the applications 344 of the computing cluster 340 exceeds a capacity threshold (e.g., a maximum capacity) of the current compute nodes 342 of the computing cluster 340. In response to determining that a future traffic level exceeds the capacity threshold of the compute nodes 342 of the computing cluster 340, the cluster scaling component 316 may scale the computing cluster 340 by initiating the creation of an additional compute node to be added to the cluster. For example, the cluster scaling component 316 may request a new node via an application programing interface (API) of the computing cluster 340. Thus, the cluster scaling component 316 may preemptively scale the computing cluster 340 based on future traffic levels predicted by the traffic prediction component 314.

FIG. 4 is a utilization-time diagram 400 illustrating an example future traffic prediction for preemptive scaling of a computing cluster, according to some embodiments. The diagram 400 shows a capacity threshold 402 at which point an additional computing node may be needed to support the traffic levels and corresponding workload of the cluster. The capacity threshold 402 may correspond to 100% utilization of the current nodes of the cluster or any other capacity threshold, utilization, or traffic level to trigger the addition of a new compute node to the cluster. As depicted, at time T1 a traffic level 404 or utilization may be known from traffic metrics extracted from the applications executing on the cluster. Based on the current traffic level 404 and at least a portion of historical traffic data, a trajectory-based cluster auto-scaler may predict the future traffic level 406 (e.g., by extrapolating a traffic trend into the future). Therefore, in the example depicted in FIG. 4, the projected traffic level 406 of the cluster is projected to exceed the capacity threshold 402 of the cluster at time T2. Accordingly, because the traffic level is predicted to exceed the capacity threshold 402 at time T2, the trajectory-based cluster auto-scaler may initiate the addition of a new computing node to the cluster to support the additional workload after time T2 that exceeds the current capacity threshold 402 of the cluster.

Figure 5:
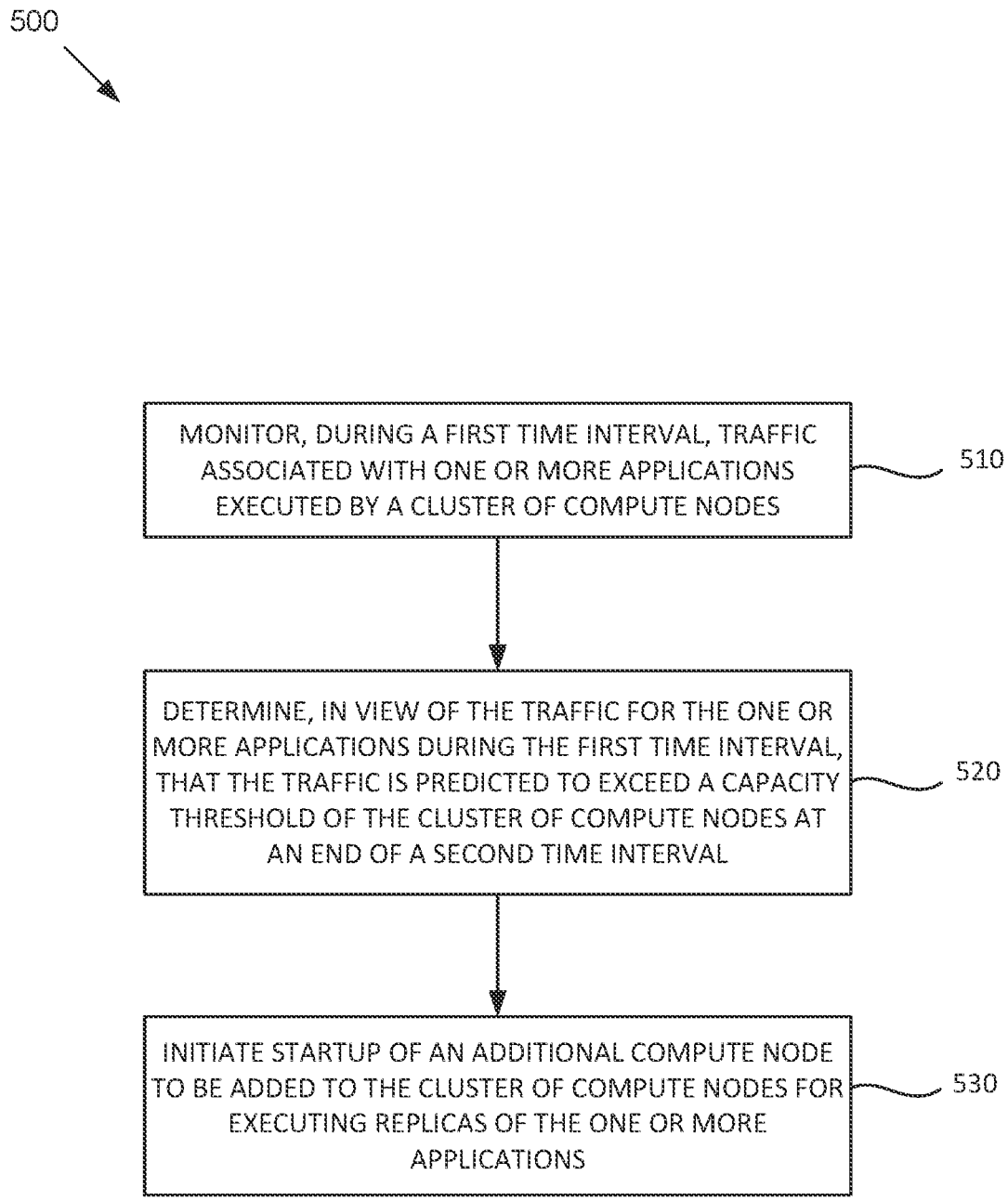
FIG. 5 depicts a flow diagram of an example method of autoscaling a serverless cluster, in accordance with some embodiments.

FIG. 5 is a flow diagram of a method 500 of virtual machine networking configuration migration, in accordance with some embodiments. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 500 may be performed by a trajectory-based cluster auto-scaler (e.g., trajectory-based cluster auto-scaler 145 of FIG. 1).

With reference to FIG. 5, method 500 illustrates example functions used by various embodiments. Although specific function blocks ("blocks") are disclosed in method 500, such blocks are examples. That is, embodiments are well suited to performing various other blocks or variations of the blocks recited in method 500. It is appreciated that the blocks in method 500 may be performed in an order different than presented, and that not all of the blocks in method 500 may be performed.

Method 500 begins at block 510, where the processing logic monitors, during a first time interval, traffic associated with one or more applications executed by a cluster of compute nodes. For example, the processing logic may collect and store metrics (e.g., traffic data) for the one or more applications executed by the cluster during the first time interval. The first time interval may correspond to a window of time up leading up to a current time. The one or more applications may be serverless applications that can be scaled up and down on the cluster of compute nodes based on the traffic metrics collected for each of the applications executing on the cluster. For example, each of the serverless applications may be scaled up or down based on concurrent requests, requests-per-second, etc. received by the serverless applications.

At block 520, the processing logic determines, in view of the traffic for the one or more applications during the first time interval, that the traffic is predicted to exceed a capacity threshold of the cluster of compute nodes at an end of a second time interval. In one example, the processing logic may predict or extrapolate the traffic levels for the cluster based on the metrics (e.g., traffic data) collected for each of the applications executed by the cluster. For example, the processing logic may apply one or more statistical analyses or machine learning models to historical and current traffic of the entire cluster to predict future traffic levels of the entire cluster.

In one example, the capacity threshold of the cluster may be the maximum processing capacity of the cluster. In another example, the capacity threshold may be a percentage of the maximum capacity of the cluster, a defined limit for the current cluster, or any other threshold associated with the traffic levels and/or capacity of the current cluster. The second time interval may correspond to an amount of time required for an additional compute node to be booted up and added to the cluster. For example, the processing logic may determine whether the traffic is predicted to exceed the capacity threshold of the cluster within a time window around (e.g., before and after) the time required for a new node to be added to the cluster. For example, if the additional compute node requires 30 minutes to boot up then the second time interval may be 25-40 minutes from the current time such that the processing logic can determine whether the traffic is predicted to exceed the capacity with enough time to boot up the new node with little or no downtime (e.g., waiting for the new node after the capacity threshold is reached).

At block 530, the processing logic initiates startup of an additional compute node to be added to the cluster of compute nodes for executing replicas of the one or more applications. The processing logic may use a cluster API to initiate the addition of a new node to the cluster in response to determining that the traffic is predicted to exceed the current capacity threshold of the compute node. Once an additional node is added to the cluster, the capacity threshold of the cluster may be updated accordingly. For example, the capacity threshold may be increased in view of the additional compute capacity of the additional node. Therefore, the processing logic may scale the cluster preemptively as necessary in view of the traffic levels of the cluster and predicted traffic levels of the cluster.

Figure 6:
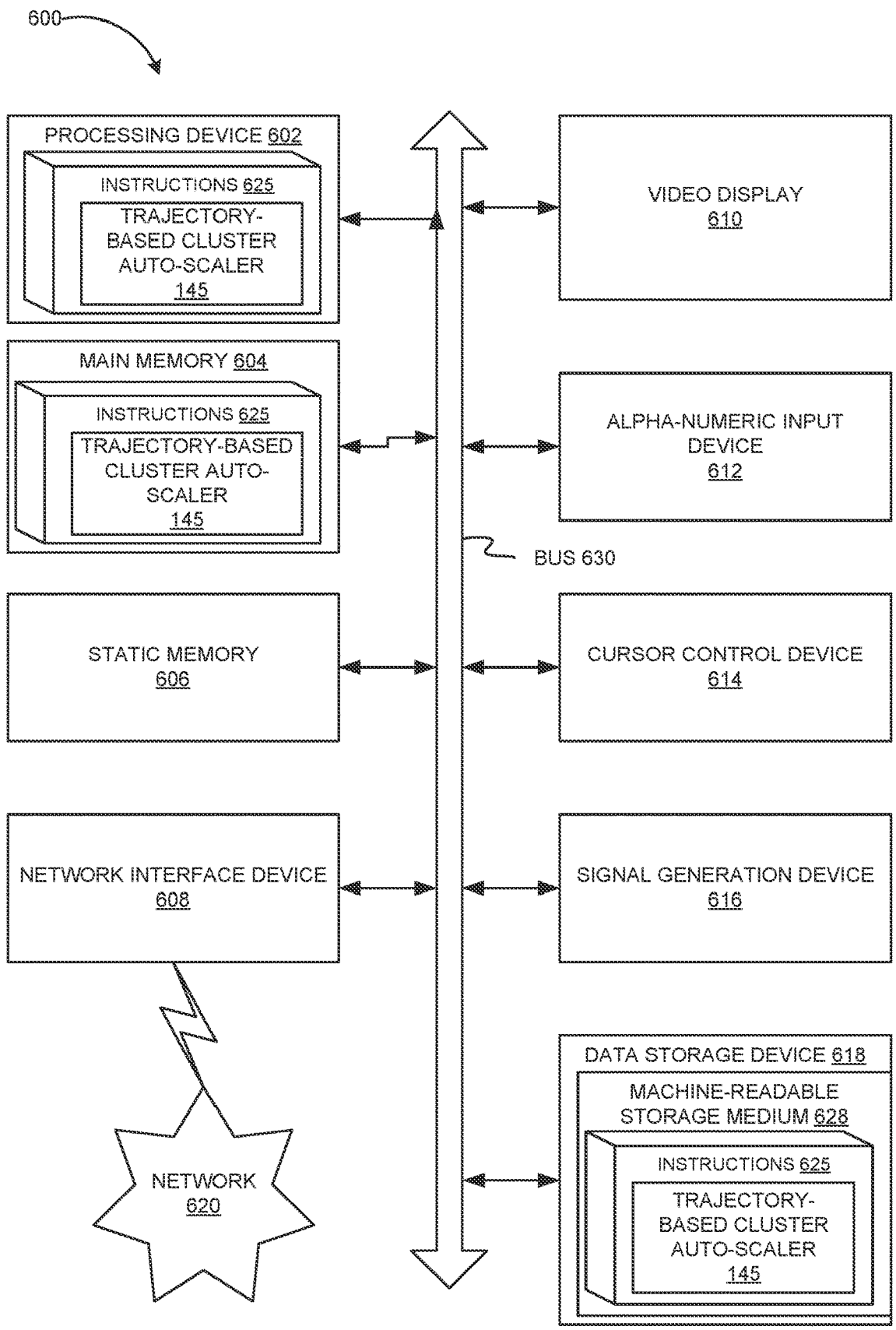
FIG. 6 is a block diagram of an example apparatus that may perform one or more of the operations described herein, in accordance with some embodiments of the present disclosure.

FIG. 6 is a block diagram of an example computing device 600 that may perform one or more of the operations described herein, in accordance with some embodiments. Computing device 600 may be connected to other computing devices in a LAN, an intranet, an extranet, and/or the Internet. The computing device 600 may operate in the capacity of a server machine in client-server network environment or in the capacity of a client in a peer-to-peer network environment. The computing device 600 may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also comprise one or more special-purpose processing devices such as an application specific integrated circuit (ASIC), a field programmable gate array (FPGA), a digital signal processor (DSP), network processor, or the like. The processing device 602 may be configured to execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a trajectory-based cluster auto-scaler, e.g., trajectory-based cluster auto-scaler 145, for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "routing," "updating," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
   monitoring, during a first time interval, traffic associated with one or more applications executed by a cluster of compute nodes, wherein each compute node of the cluster of compute nodes comprises a virtual machine;
   scaling a number of replicas of the one or more applications based on the traffic associated with the one or more applications over a second time interval, the second time interval corresponding to an amount of time associated with instantiating a replica of the one or more applications;
   determining, by a processing device, in view of the traffic associated with the one or more applications during the first time interval, that the traffic is predicted to exceed a capacity threshold of the cluster of compute nodes at an end of a third time interval, wherein the third time interval is longer than the second time interval; and
   initiating startup of an additional compute node comprising an additional virtual machine to be added to the cluster of compute nodes for executing replicas of the one or more applications based on the traffic being predicted to exceed the capacity threshold of the cluster of compute nodes at the end of the third time interval, wherein the third time interval corresponds to an amount of time associated with starting up the additional compute node.

2. The method of claim 1, wherein the one or more applications comprise one or more serverless applications.

3. The method of claim 1, wherein the traffic comprises a number of concurrent requests received by each of the one or more applications executed by the cluster of compute nodes.

4. The method of claim 1, wherein monitoring the traffic associated with the one or more applications executed by the cluster of compute nodes comprises:
   scraping one or more traffic metrics from each of the one or more applications; and
   determining a total traffic level of the cluster during the first time interval in view of the one or more traffic metrics from each of the one or more applications.

5. The method of claim 4, wherein determining that the traffic associated with the one or more applications is predicted to exceed the capacity threshold of the cluster of compute nodes at the end of the third time interval comprises:
   extrapolating the total traffic level of the cluster during the first time interval over the third time interval.

6. The method of claim 5, wherein extrapolating the total traffic level of the cluster comprises:
   applying a statistical analysis or machine learning model on the total traffic level of the cluster during the first time interval to estimate a future total traffic level of the cluster at the end of the third time interval.

7. A system comprising:
   a memory; and
   a processing device, operatively coupled to the memory, the processing device to:
     monitor, during a first time interval, traffic associated with one or more applications executed by a cluster of compute nodes, wherein each compute node of the cluster of compute nodes comprises a virtual machine;
     scale a number of replicas of the one or more applications based on the traffic associated with the one or more applications over a second time interval, the second time interval corresponding to an amount of time associated with instantiating a replica of the one or more applications;
     determine, in view of the traffic associated with the one or more applications during the first time interval, that the traffic is predicted to exceed a capacity threshold of the cluster of compute nodes at an end of a third time interval, wherein the third time interval is longer than the second time interval; and
     initiate startup of an additional compute node comprising an additional virtual machine to be added to the cluster of compute nodes for executing replicas of the one or more applications based on the traffic being predicted to exceed the capacity threshold of the cluster of compute nodes at the end of the third time interval, wherein the third time interval corresponds to an amount of time associated with starting up the additional compute node.

8. The system of claim 7, wherein the one or more applications comprise one or more serverless applications.

9. The system of claim 7, wherein the traffic comprises a number of concurrent requests received by each of the one or more applications executed by the cluster of compute nodes.

10. The system of claim 7, wherein to monitor the traffic associated with the one or more applications executed by the cluster of compute nodes, the processing device is to:
   scrape one or more traffic metrics from each of the one or more applications; and
   determine a total traffic level of the cluster during the first time interval in view of the one or more traffic metrics from each of the one or more applications.

11. The system of claim 10, wherein to determine that the traffic associated with the one or more applications is predicted to exceed the capacity threshold of the cluster of compute nodes at the end of the third time interval, the processing device is to:
   extrapolate the total traffic level of the cluster during the first time interval over the third time interval.

12. The system of claim 11, wherein to extrapolate the total traffic level of the cluster, the processing device is to:
   apply a statistical analysis or machine learning model on the total traffic level of the cluster during the first time interval to estimate a future total traffic level of the cluster at the end of the third time interval.

13. A non-transitory computer-readable storage medium including instructions that, when executed by a processing device, cause the processing device to:
   monitor, during a first time interval, traffic associated with one or more applications executed by a cluster of compute nodes, wherein each compute node of the cluster of compute nodes comprises a virtual machine;
   scale a number of replicas of the one or more applications based on the traffic associated with the one or more applications over a second time interval, the second time interval corresponding to an amount of time associated with instantiating a replica of the one or more applications;
   determine, by the processing device, in view of the traffic associated with the one or more applications during the first time interval, that the traffic is predicted to exceed a capacity threshold of the cluster of compute nodes at an end of a third time interval, wherein the third time interval is longer than the second time interval; and
   initiate startup of an additional compute node comprising an additional virtual machine to be added to the cluster of compute nodes for executing replicas of the one or more applications based on the traffic being predicted to exceed the capacity threshold of the cluster of compute nodes at the end of the third time interval, wherein the third time interval corresponds to an amount of time associated with starting up the additional compute node.

14. The non-transitory computer-readable storage medium of claim 13, wherein the one or more applications comprise one or more serverless applications.

15. The non-transitory computer-readable storage medium of claim 13, wherein the traffic comprises a number of concurrent requests received by each of the one or more applications executed by the cluster of compute nodes.

16. The non-transitory computer-readable storage medium of claim 13, wherein to monitor the traffic associated with the one or more applications executed by the cluster of compute nodes, the processing device is to:
   scrape one or more traffic metrics from each of the one or more applications; and
   determine a total traffic level of the cluster during the first time interval in view of the one or more traffic metrics from each of the one or more applications.

17. The non-transitory computer-readable storage medium of claim 16, wherein to determine that the traffic of the one or more applications is predicted to exceed the capacity threshold of the cluster of compute nodes at the end of the third time interval, the processing device is to:
   extrapolate the total traffic level of the cluster during the first time interval over the third time interval.

* * * * *